Figure 1:
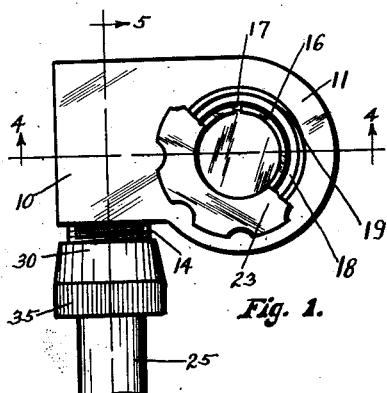

April 24, 1928.

R. A. SZEITS 1,667,704

TERMINAL FOR STORAGE BATTERIES

Filed Sept. 14, 1926

INVENTOR.

Patented Apr. 24, 1928.

1,667,704

UNITED STATES PATENT OFFICE.

RUDOLPH A. SZEITS, OF HAWTHORNE, CALIFORNIA.

TERMINAL FOR STORAGE BATTERIES.

Application filed September 14, 1926. Serial No. 135,326.

This invention relates to improvements in battery terminals and more particularly to storage battery connectors and has for its object to provide a simple, efficient and inexpensive device of this character.

Another object of my invention is to provide improved means for retaining storage battery terminals and the like wherein a positive clamp is provided for seating the terminals.

A still further object of my invention is to provide a unitary structure designed to retain lead-in circuit-making wires at one end thereof and at the same time to securely attach in good electrical contact a battery terminal, means being provided in the nature of an all-lead filling whereby the lead-in wires and terminal are interconnected and completely surrounded by material that will not corrode yet which is a good conductor of electricity.

It is well known that the terminals of most storage batteries have a short life due to the fact that they materially and rapidly corrode during the electrolytic process and action while the battery is continuously in service, and therefore they must frequently be replaced, which calls for great expense of maintaining storage batteries.

I have found after considerable experimentation that my battery terminal retaining means for circuit-making purposes will have a very long life, and will not have a tendency to corrode due to the fact that I anchor the circuit-making terminals in an all-lead wall, film coating or filling, and thus while the usual electrical conduction takes place none of the usual corrosive defects are present by which the terminals will deteriorate.

With the above and other objects in view my invention consists in the combination, arrangement and details of construction disclosed in the drawings and specification, and then more particularly pointed out in the appended claims.

In the drawings, which are merely illustrative of my invention and in which similar reference characters designate similar parts thruout the respective views, Figure 1 is a top plan view, partly broken away, of my invention.

Figure 3:
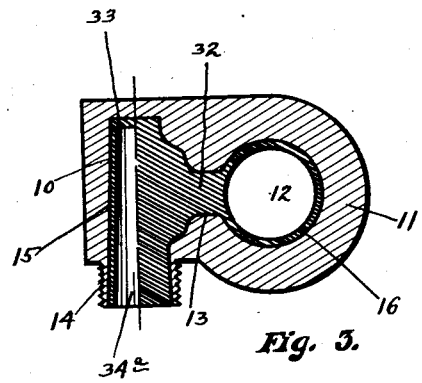
Figure 2:
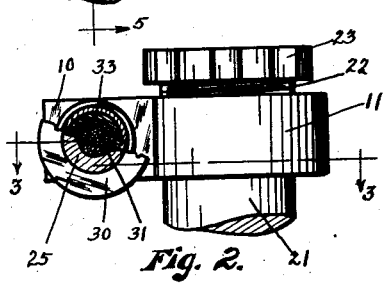
Figure 4:
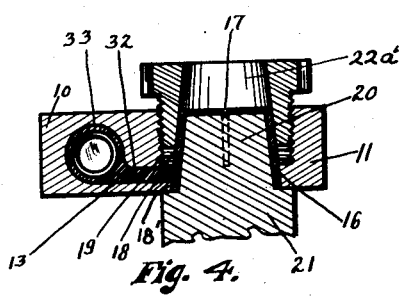
Figure 6:
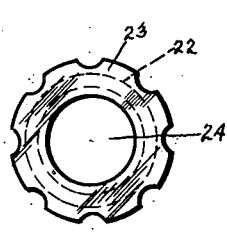
Figure 5:
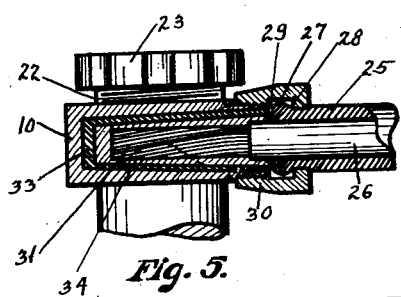
Figure 7:
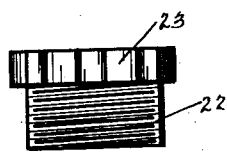
Figure 8:

Figure 2 is a side elevation, broken away in part, showing the details of clamping the lead-in wires, Figure 3 is a cross-sectional view taken thru my invention, Figure 4 is another sectional view, taken in elevation, showing the terminal in applied position, Figure 5 is a detail sectional view of my invention taken in a plane at right angles to Figure 2, Figure 6 is a top plan view of a clamping nut, Figure 7 is a side elevation of the clamping nut, and Figure 8 is a fragmental detail view of a terminal to be described.

Referring to the drawings 10 designates a suitable insulator block or base member of any desirable shape, having the rounded extension 11 formed with an opening 12, preferably cylindrical in contour. The block 10 is also formed with a rectilinear or other channel 13 starting at a point adjacent opening 12 and continuing towards the opposite end of the block where it intercommunicates with a bore 15 formed in the block tangentially of opening 12 and at right angles to the axis of said opening. An integral nipple 14 projects in line with the bore 15 and is formed with external screw-threads for a purpose hereinafter set forth.

An annular socket 18 is formed in said block 10 caused by the formation integrally upon the block of an upstanding split conical ring 16, preferably made of lead or other non-corroding material, which ring is disposed in registration with the opening 12 so that the annular socket 18 skirts this ring, and is formed upon its internal wall with screw-threads 19. It will be seen from Figure 4 that the channel 19 opens out against the split conical ring 16.

The battery terminal consists of a cylindrical metal conducting body 21 formed at its upper end with an annular shoulder 22ª, and with an outwardly tapering extremity or portion 20. The ring 16 engages a marginal under edge 18' on the bottom side of the block 10, shown in Figure 4. I provide a clamping member or nut externally screw-threaded, and designated 22, which is formed with a corrugated head or flange 23 by which it may be forcibly turned; this nut screws into the screw-threaded wall 19 of the socket 18, and is formed with an internal downwardly-flaring and conical surface 22ª formed tubular in contour.

25 designates the outer insulating sleeve or shell of a flexible circuit-making cord 26 encased therein and provided with the strands of wire 31 providing lead-in wires or similar circuit-making electrical terminals; an annular hump is formed as at 27 upon the end of the insulating shell 25 which is squeezed snugly into the socket 28 of the clamping or binding sleeve or nut 30 which is screw-threaded externally of the nipple 14. It will be seen that the strands of wire or the like 31 will fit loosely into the bore or passage 34ª, (see Figure 3) which passage is formed directly into a leaden filling or other non-corrosive filling 33.

In operation I take the strands of wire 31, insert same into bore 15, then push the humped end of insulator sleeve or shell 25 along with conductor 26 against the nipple until the nut 30 binds screw-threadedly the nipple 14. Inasmuch as channel 13 communicates with annular socket 17, and the clamping nut 22 is removed from block 10, I next may take molten lead or similar non-corrosive material and pour same into the end of channel 13 which shows thru socket 18, allowing the metal in molten condition to run as in a sprue, until it completely fills channel 13; previously to pouring this molten lead, I may either have inserted the strands of wires 31, or else have introduced a round plug into bore 15, in a manner to provide an annular jacket therearound; now it will be seen that as the molten lead runs thru the channel 13, it will directly surround the wire strands endwise and around their exterior lengths and completely embrace the same as with a film 33; or should the plug be inserted instead of the strands of wire then the molten lead will provide the leaden shell 33, with the bore 34ª, the latter being developed as the plug is withdrawn. Then the strands of wire 31 may be inserted into the passage 34ª, and be united electrically with the lead filling 33 by means of a conductive cement 34 or lead itself, if desired. As the molten lead also contacts the leaden split conical ring 16 it will be seen that a direct continuous electrical but non-corrosive interconnection is provided between the insert in bore 15 and ring 16.

The terminal 21 is now taken, and its shoulder 22ª caused to contact and underly the marginal underedge 18' of the block 10, and thereupon the conical or tapering end 20 of the terminal will be snugly seated in projecting relation in the leaden ring 16; the nut 22 is now screw threaded into the socket 18, and its conical tubular surface 22ª' caused to engage the split ring 16, as the nut is screwed home, and as the nut is turned it wedges the split portions of ring 16, thus crowding these portions compressingly around the tapering end 20 of battery terminal 21. In this manner a positive yet removable contact is made between the terminal and the wire strands 31, while the continuous leaden insert prevents the corrosion of any of the terminal connectors, while acting to allow the passage of electricity when a circuit is closed.

I do not intend to limit myself to the exact details of construction shown but claim all variations falling within the scope and purview of the appended claims.

What I desire to protect and seek by Letters Patent is:—

1. A device as described consisting of a base member formed with a bore, a collar, and a channel communicating with said bore and collar, said channel being completely filled with lead, means associated with said collar for clamping in position an electrical terminal, said means having a leaden contact with said lead filling in said channel, and a leaden film in said bore contacting with said leaden filling and adapted to receive and clamp an electrical cord.

2. A device as described consisting of a base member formed with an internal bore, a nipple formed in a plane with said bore externally of said base member, a leaden film lining the said bore, a flexible electrical circuit-making cord welded so as to be held in contact with said leaden film of said bore and projecting snugly into the latter, means carried by said base member for clamping a terminal of a battery, and means establishing a non-corrosive connection between said terminal and said leaden film of said bore.

3. In combination, an insulating body formed with a circular opening at one end and with an internal bore arranged tangentially of said opening, there being a channel intercommunicating with said bore and opening, a non-corrosive terminal receiving and clamping fitting engageable in said opening, a threaded nipple projecting from said bore and receiving a cord containing lead-in wires, said cord projecting into said bore, means engaging said nipple threadedly and also said cord to position the latter relatively to said bore, and a filling of non-corrosive but conductive material around the terminals of said cord in said bore, and extending into said channel to contact said fitting.

4. In combination with an insulator block formed with a cylindrical socket, a split leaden conical ring carried upon said block and extending centrally and concentrically of said socket for receiving and clamping a terminal, a circuit-making wire member projecting into said block, a leaden body contained in said block and connecting in electrical contact said wire member and said leaden ring, and rotatable means removably engaging in said socket and exerting a compressive clamping action around the split portions of said ring.

5. In combination with an insulating block formed with a bore and having a threaded nipple projecting in line with said bore and communicating therewith, said block formed with an opening, a split conical leaden ring formed in registration with said opening, said block being formed with a channel around said ring having a threaded wall and with a rectilinear channel communicating with the first channel and with said bore, a terminal having an annular shoulder engaging the marginal edge of said opening, and having a tapering portion snugly projecting into said ring, twisted wires projecting into said bore, a flexible sleeve enclosing said wires and having an annular hump, a clamping sleeve forcing said annular hump of said sleeve against the bore and threadedly engaging said nipple, a leaden filling in said rectilinear channel extending into said bore to surround said wires, and also contacting said leaden ring, means holding said wires against displacement and a nut for manually compressing said split ring around said terminal.

6. In combination, an insulator base member having an internal bore, a leaden wall formed coextensively in said bore, a leaden body joining said leaden wall at one point and extending internally in said base member, said base member having an opening therethru at right angles to said leaden body, and means formed of insulated material for simultaneously engaging said base member and said leaden body for clamping a terminal extending into said opening, in contact with said leaden body.

In witness whereof he has hereunto set his hand this thirty first day of August, 1926.

R. A. SZEITS.